US008123025B2

(12) United States Patent
Gonzalez Alemany et al.

(10) Patent No.: US 8,123,025 B2
(45) Date of Patent: Feb. 28, 2012

(54) TURNAROUND CURVE SYSTEM FOR A CHAIN CONVEYOR SYSTEM

(75) Inventors: Miguel Angel Gonzalez Alemany, Oviedo (ES); Juan Domingo Gonzalez Pantiga, Gijon (ES); Manuel Alonso Cuello, Gijon (ES); José Ojeda Arenas, La Fresneda-Siero (ES)

(73) Assignees: Thyssenkrupp Elevator Innovation Center, S.A., Gijon, Asturias (ES); Thyssenkrupp Elevator (ES/PBB) Ltd., London (GB)

( * ) Notice: Subject to any disclaimer, the term of this patent is extended or adjusted under 35 U.S.C. 154(b) by 114 days.

(21) Appl. No.: 12/205,343

(22) Filed: Sep. 5, 2008

(65) Prior Publication Data

US 2009/0065328 A1 Mar. 12, 2009

(30) Foreign Application Priority Data

Sep. 5, 2007 (ES) .................................. 200702379

(51) Int. Cl.
*B65G 23/06* (2006.01)

(52) U.S. Cl. ......................... 198/834; 198/330; 474/155

(58) Field of Classification Search .................. 198/832, 198/834, 835, 330; 474/155
See application file for complete search history.

(56) References Cited

U.S. PATENT DOCUMENTS

| | | | | |
|---|---|---|---|---|
| 2,698,078 | A * | 12/1954 | Harrison | 198/834 |
| 2,905,308 | A * | 9/1959 | Hansen | 198/332 |
| 3,002,604 | A * | 10/1961 | Brems | 198/832 |
| 3,314,526 | A * | 4/1967 | Price et al. | 198/834 |
| 3,510,264 | A * | 5/1970 | Sprigg | 422/189 |
| 3,586,393 | A * | 6/1971 | Myers | 305/160 |
| 3,915,293 | A * | 10/1975 | Melchiorre et al. | 198/408 |
| 4,130,192 | A * | 12/1978 | Kraft | 198/327 |
| 4,809,840 | A * | 3/1989 | Nakatani | 198/328 |
| 4,953,685 | A * | 9/1990 | Johnson | 198/328 |
| 5,009,302 | A * | 4/1991 | Sansevero | 198/328 |
| 5,148,906 | A * | 9/1992 | Brunn | 198/328 |
| 5,388,685 | A * | 2/1995 | Szuba | 198/803.2 |
| 5,697,486 | A * | 12/1997 | Krampl | 198/332 |
| 6,078,766 | A * | 6/2000 | Kurotaka | 399/165 |
| 6,141,522 | A * | 10/2000 | Tsuruoka et al. | 399/302 |
| 6,196,381 | B1 * | 3/2001 | Kato et al. | 198/853 |
| 6,685,003 | B2 * | 2/2004 | Copeland et al. | 198/326 |
| 6,796,416 | B2 * | 9/2004 | Ogura et al. | 198/334 |
| 7,353,932 | B2 * | 4/2008 | Aulanko et al. | 198/330 |
| 7,568,571 | B2 * | 8/2009 | Ogimura et al. | 198/332 |
| 7,600,627 | B2 * | 10/2009 | Ishikawa et al. | 198/330 |
| 7,918,326 | B2 * | 4/2011 | Illedits et al. | 198/330 |

FOREIGN PATENT DOCUMENTS

WO WO 03/066501 8/2003

* cited by examiner

*Primary Examiner* — Joseph A Dillon, Jr.
(74) *Attorney, Agent, or Firm* — Merchant & Gould P.C.

(57) ABSTRACT

The invention relates to a turnaround curve system for a chain conveyor system, having a chain having linear traction which is driven in turnaround sections by means of turnaround guides (7). The turnaround guides (7) have a geometry obtained by means of a family of curves corresponding to paths defined by six points (1-6), the six points (1-6) corresponding to six linkage positions of consecutive links of the chain in the turnaround sections. The system allows the turnaround sections to be more compact and extend the life of the rollers of the chain, since the rollers are subjected to smaller loads.

13 Claims, 4 Drawing Sheets

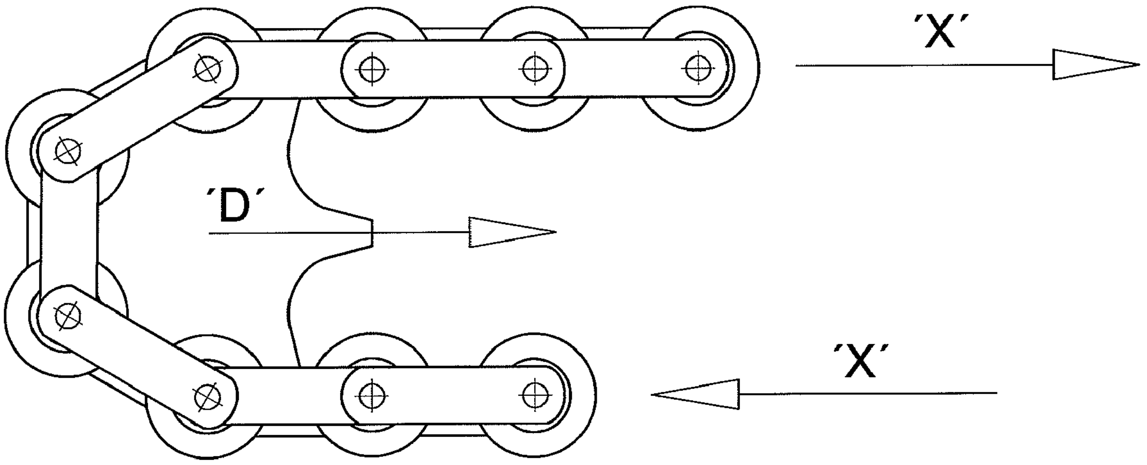
FIG. 3
FIG. 4
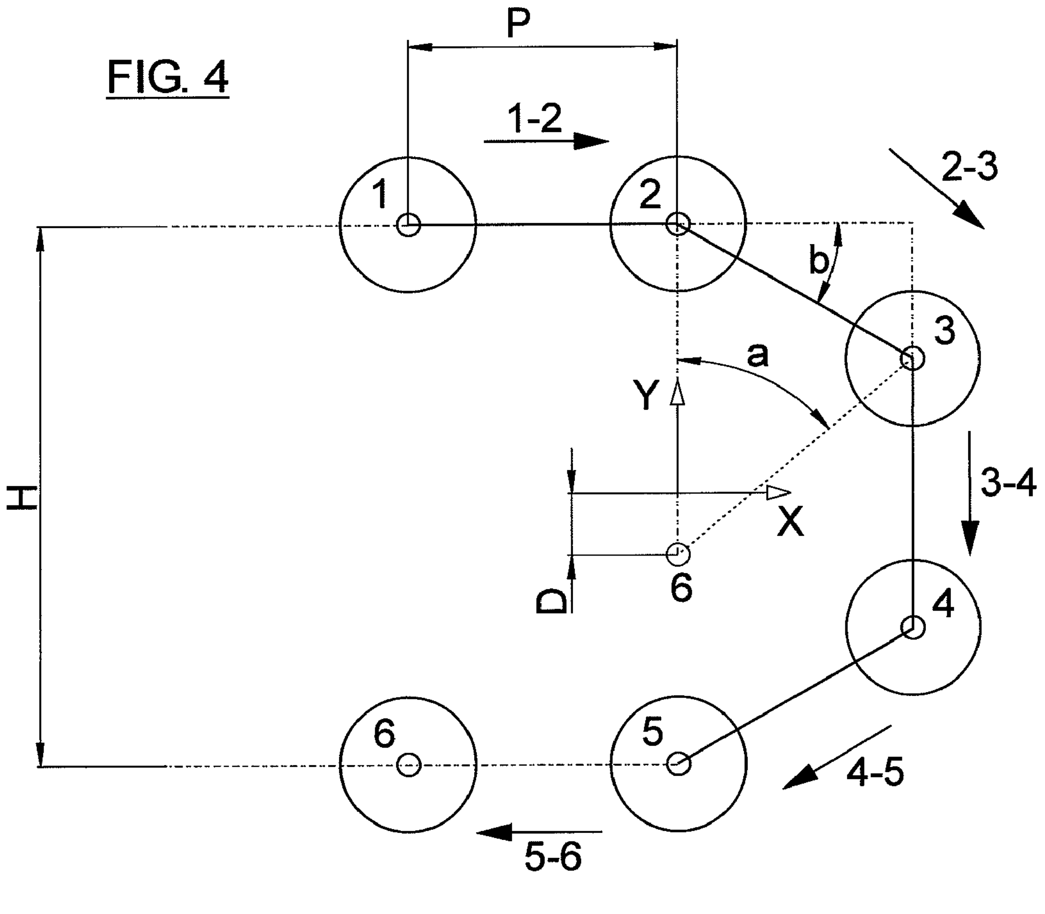

TURNAROUND CURVE SYSTEM FOR A CHAIN CONVEYOR SYSTEM

This application a claims priority to Serial No. 200702379, filed 5 Sep. 2007 in Spain and which application is incorporated herein by reference.

FIELD OF THE INVENTION

The present invention relates to a moving walkway comprising a chain with linear traction which is driven in the turnaround sections by means of turnaround guides.

More specifically, the present invention relates to a moving walkway in which the geometry of the turnaround guides is obtained by means of curves compensating for the vibrations and movements caused by turnarounds by means of wheels or curves with a circular profile.

BACKGROUND OF THE INVENTION

Conventional moving walkways include a chain of conveyor plates moving in a circuit for the purpose of providing a continuous movement along a specific path. The conveyor plates or steps are connected to said traction chain circuit, which chain acts moved by a drive system.

Due to the fact that the wheel moving said chain must have a minimum number of teeth to prevent speed variation problems in the walkway, the size of the head is defined by the primitive diameter of this wheel.

In the tensioning head, the chain is usually tensioned with a wheel having a number of teeth identical to that of the drive wheel or with a circular guide which must have a minimum radius to prevent the tensioner from oscillating due to the aforementioned effect.

As a result, the sizes of the heads are determined by the size of the minimum guide necessary to carry out the oscillation-free turnaround or by the primitive diameter of the turnaround wheel.

In a conventional walkway, the only way to reduce the size of these two turnaround options is the reduction of the chain pitch, but this is not cost-effective because it forces placing too many linkages in the chain. In addition, there comes a time in which the linkages cannot be sized if the pitch is very small.

The number of teeth in the drive wheel cannot be reduced without the speed fluctuating but a wheel with less teeth could be placed in the tensioning station. In this case, sinusoidal variations of the position of the tensioning wheel occur when the upper branch and the lower branch have the same speed determined by the tractor system.

If the turnaround is carried out with a circular guide, the problem is the same as when a wheel with a primitive radius equal to the radius of the turnaround curve is used. If this radius is reduced, the movement is increasingly greater like as if the number of teeth of the wheel is reduced.

In short, the dimensions of moving walkways are fixed in the drive by a minimum number of teeth and in the tensioning head by a minimum radius preventing the aforementioned effect, making it impossible to reduce the size of the walkway.

Furthermore, when the size of the turnarounds is to be reduced, it is necessary for the size of the pallets to be as small as possible to turn them around in less space and it is necessary to turn around in radii which are as small as possible. This can be achieved either with turnaround wheels of up to at least 3 teeth or with circular turnaround curves.

Due to the effects relating to the fact that the pallets do not form a continuous band, when the walkway is tensioned an oscillation occurs in the position of the tensioner, causing vibrations which are transmitted to the rest of the walkway, wear in the tensioning mechanism and noise.

This effect is greater the smaller the number of teeth of the wheel with which the turnaround is carried out or the smaller the radius of the circular curve with which the turnaround is carried out.

Methods have been proposed which provide turnaround curves for solving this problem, like that of application WO03066501. This document describes the use of a geometry eliminating the vibrations caused in the traction chain when the turnaround is carried out with a circular guide, by means of a turnaround guide formed by three sections, two of which sections are circular and have a radius equal to half the distance between the upper branch and the lower branch of the straight part of the stairs and the other of which is defined by the two previous sections when the speed of the lower branch and the upper branch are constant.

This method causes, in certain combinations of chain pitch and distances between branches, that the first derivative of the path is not the same when it approaches a control point at each of its two ends. This causes the guiding path to not be smooth enough, giving rise to low-quality rolling as well as excessive wear of the guiding rollers.

When turnarounds are carried out on very few rollers rolling on a guide, there is the problem that upon tensioning, said tension rests on very few rollers and there is the risk of loading them excessively. For some combinations of chain pitch and walkway height, the method proposed in WO03066501 determines a not very vertical contact at the time when only two rollers are on the turnaround guide, causing the tension to which each roller is subjected to be very high, such rollers being able to be damaged, as can be seen in FIG. 1.

In addition, this patent proposes the use of said guide for mechanical stairs. The size of each of the steps of the stairs has a minimum size which is fixed by the height of the turnaround heads. It is not possible to reduce the size of the stairs by means of using this turnaround curve.

SUMMARY OF THE INVENTION

The object of the present invention is to eliminate the problems set forth by means of a turnaround curve system for chain conveyor systems, which allows reducing to a great extent the size of the heads of the walkway, decreasing transport, civil construction and manufacturing costs. With a curve like this one, not only it is possible to obtain rolling walkways that are much more compact than any of those of the state of the art, but also much more compact paths for turning around traction chains of mechanical stairs are achieved.

According to the present invention, the geometry of the turnaround guides is obtained by means of a family of curves corresponding to the paths described by six points, said six points corresponding to six linkage positions of consecutive links of the chain in the turnaround areas, such that:

- the first path between the first point and the second point and
- the fifth path between the fifth point and the sixth point define a constant linear speed parallel to a straight section of the conveyor system between the turnaround sections;
- the second path and the fourth path have a certain geometry;
- the third path is determined by the position of the first, second, fourth and fifth linkages to conserve a distance between links.

When each linkage passes to a position occupied by the following linkage, in a small time interval "t", the paths are defined by six points defined by the following equations:

$$X1=-P;$$

$$Y1=H/2;$$

$$X2=0;$$

$$Y2=H/2;$$

$$X3=P*\cos(b);\ \text{where } b=a\ \sin((H/2-P/2)/P)$$

$$X3=P/2;$$

$$X4=P*\cos(b);\ \text{where } b=a\ \sin((H/2-P/2)/P)$$

$$X4=-P/2;$$

$$X5=0;$$

$$Y5=-H/2;$$

$$X6=0;$$

$$Y6=-H/2;$$

where:

P is the chain pitch value and H is the distance between a first branch or upper branch (departure) and a second branch or lower branch (return) of the chain; and the curves of the mentioned paths being defined by the following equations $$X1(t)=-P+P*t;$$

$$Y1(t)=H/2; \qquad \text{1-2:}$$

$$(X2-X1)\hat{}2=(Y2-Y1)\hat{}2=P\hat{}2;$$

$$X2/(Y2+D)=\tan(a)*t;\ \text{where } a=a\ \tan(P*\cos(b)/(P/2+D)); \qquad \text{2-3}\equiv\text{f1(D):}$$

$$(X3-X2)\hat{}2+(Y3-Y2)\hat{}2=P\hat{}2;$$

$$(X3-X4)\hat{}2+(Y3-Y4)\hat{}2=P\hat{}2; \qquad \text{3-4:}$$

$$t'=1-t$$

$$X4(t')=X2(t);$$

$$Y4(t')=-Y2(t); \qquad \text{4-5:}$$

$$X5(t)=-P*t;$$

$$Y5(t)=-H/2; \qquad \text{5-6:}$$

Assigning to "t" a value comprising between 0 and 1 and wherein D is a parameter with an optical value when the following conditions are met:

$$dX2/dY2(t=1)=dX3/dY3(t=0)$$

$$dX3/dY3(t=1)=dX4/dY4(t=0)$$

The geometry of the guide of the present invention drives the linkages of the traction chain over the curves characterized by the previous equations.

There may be a guide and a counterguide in the turnaround areas, which guide and counterguide can be manufactured by press forming, deep drawing, by means of machining, etc. Furthermore, the guide profile can be fixed to the frame of the walkway or assembled with a device which allows tensioning the traction chain with respect to the frame.

According to the invention, the geometry of the guide eliminates the effect of fluctuation in the position of the tensioning mechanism as well as the vibrations, noise and wear associated thereto.

If the movement is communicated to the traction chain of the walkway by means of a linear mechanism separated from the turnaround, as occurs in conventional walkways, the turnaround guide of the invention allows reducing the size of the drive head. In the same way, the size of the tensioning head can be reduced with the same guide.

In addition, the size of the pallet can be reduced until it coincides with each of the links forming the traction chain and even that the pallets, joined to one another, form the actual traction chain, carrying out the turnaround on the support wheels of the pallets. By combining these two concepts, the compactness of the walkway can be increased with respect to the traditional concept.

A walkway with a guide like that of the present invention returns through the lower branch exactly the same amount of movement which is provided through the upper branch, allowing in the long run that when the tensioning is carried out with this guide, it does not move, preventing the aforementioned vibrations, noise and wear.

BRIEF DESCRIPTION OF THE DRAWINGS

A series of drawings is very briefly described below which aid in better understating the invention and which are expressly related to an embodiment of said invention set forth as a non-limiting example thereof.

FIG. 3 shows a chain turned around by a wheel with 6 teeth.

FIG. 4 shows the situation of the guide for obtaining the return guide according to the invention.

DETAILED DESCRIPTION OF THE PREFERRED EMBODIMENTS

Figure 1:
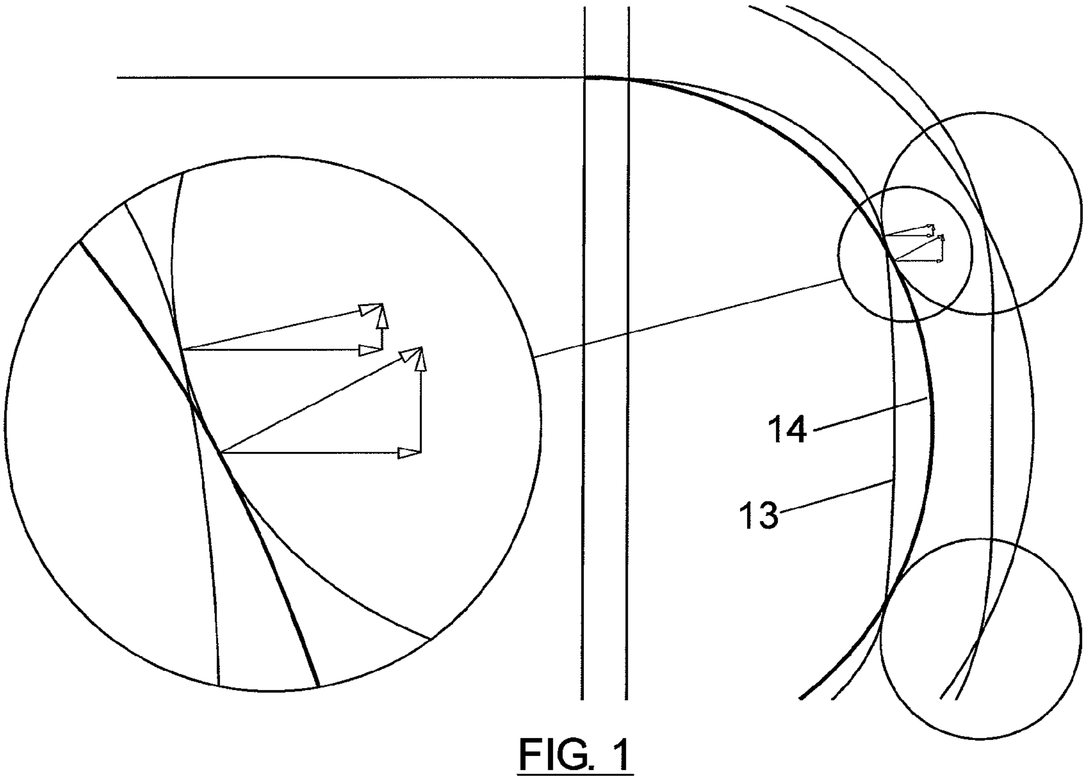
FIG. 1 is a depiction of a guide obtained with the technique of the present invention compared to a guide of the current state of the art.

As shown in FIG. 1, a guide is achieved with the present invention which is more compact, smoother and more careful with the radial loads to which the turnaround rollers are subjected, reducing the radial force F and F' for one and the same tension T.

Figure 2:
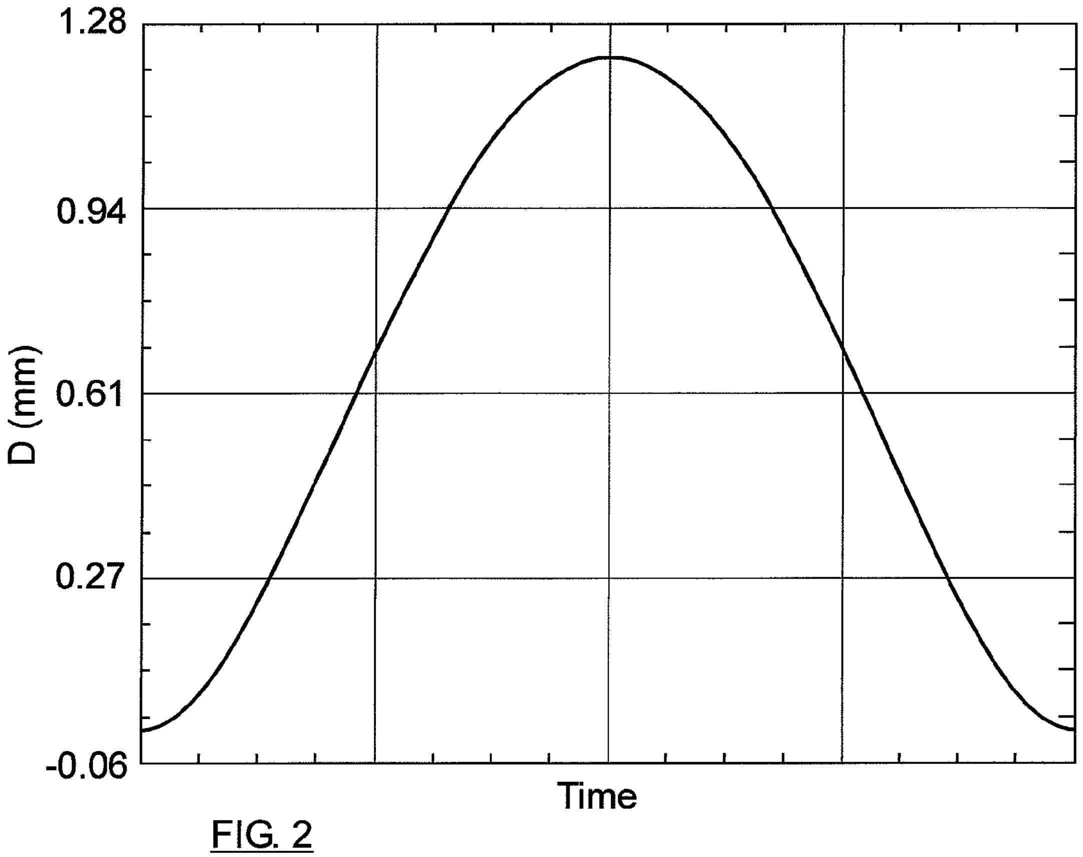
FIG. 2 is a depiction of the cycle followed by the position of the tensioning station when a wheel with 6 teeth is use to tension and turn around a chain.

To prevent the fluctuations cause by a turnaround by means of wheel with few teeth or with a circular curve (FIGS. 2 and 3), the guide of the present invention achieves the turnaround path for the chain of a moving walkway starting from the situation shown in FIG. 4.

In said figure, 6 points corresponding to 6 linkages of the traction chain are defined. The initial position of said points depends on two parameters, the distance between the upper pathway and the lower pathway of the traction chain of the walkway (H), the chain pitch (P):

$$X1=-P;$$

$$Y1=H/2;$$

$$X2=0;$$

$$Y2=H/2;$$

$$X3=P*\cos(b);\text{ where } b=a\sin((H/2-P/2)/P)$$

$$Y3=P/2;$$

$$X4=P*\cos(b);\text{ where } b=a\sin((H/2-P/2)/P)$$

$$Y4=-P/2;$$

$$X5=0;$$

$$Y5=-H/2;$$

$$X6=-P;$$

$$Y6=-H/2;$$

The path is defined by analyzing a timer interval in which point 1 passes to the position of point 2, point 2 passes to the position of point 3 and so on until reaching point 5 which moves in the negative direction of the x-axis a distance equal to the chain pitch P.

The path of point 1 during the mentioned time interval (ranging from 0 to 1 according to a parameter t) will be the following.

$$X1(t)=-P+P*t;$$

$$Y1(t)=H/2;$$

Whichever the path of point 2, this point will be equidistant to point 1 by a distance equal to the pitch (P), therefore the first equation to obtain the position of 2 will be:

$$(X2-X1)\hat{}2+(Y2-Y1)\hat{}2=P\hat{}2;$$

In addition, an adjustment parameter D will be defined which will be used to adjust the necessary path.

The second equation will be the equation of a line passing through point 6 with coordinates X=0; Y=−D and the slope of which varies constantly over time from a vertical position until the slope defined by point 6 and point 3 in their initial position. It is thus achieved that the final position of point 2 in t=1 is the same as the position in t=0 of point 3. The equation is:

$$X2/(Y2+D)=\tan(a)*t;\text{ where } a=a\tan(P*\cos(b)/(P/2+D))$$

These two equations define a path between 2 and 3 depending on the distance D which is used as a parameter, which will be called T2(D). Likewise, a path T4 is defined as the symmetrical path of T2 with respect to the X axis, which path will be the one which point 4 must follow to reach point 5. If point 5 follows a path according to the following equations in the time interval used, a performance of the traction chain moved by a system producing constant speed is simulated.

$$X5(t)=-P*t;$$

$$Y5(t)=-H/2;$$

Since the path between 4 and 5 is completely defined (T4) and furthermore point 4 must be at a distance equal to the chain pitch (P) with respect to point 5, the position of 4 with respect to time is defined by the intersection between the curve called C1 and T4

$$C1\equiv(X5-X4)\hat{}2+(Y5-Y4)\hat{}2=P\hat{}2;$$

Once the paths of 2 and 4 have been defined according to time, the path of point 3 is defined by the following equations:

$$(X3-X2)\hat{}2+(Y3-Y2)\hat{}2=P\hat{}2;$$

$$(X3-X4)\hat{}2+(Y3-Y4)\hat{}2=P\hat{}2;$$

To obtain the optimal curve for the turnaround, iteration must be carried out until finding the value of D making dX2/dY2(t=1) equal to dX3/dY3(t=0), which by symmetry will make dX3/dY3(t=1) equal to dX4/dY4(t=0), and therefore the curve can be derived and is suitable for the rolling of the rollers 8 of the traction chain therethrough.

Depending on the diameter of each of the rollers following the turnaround path, a series of inner and outer curves will be defined for the rolling of said roller.

Figure 5:
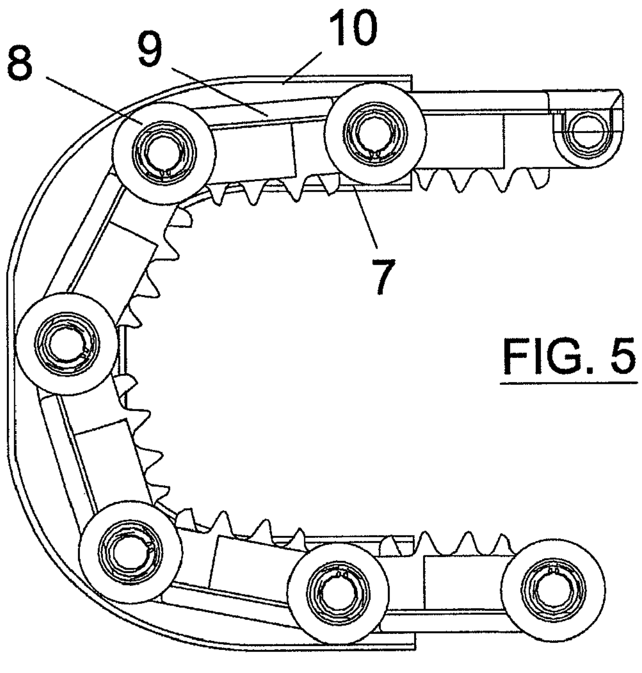
FIG. 5 shows the turnaround guide obtained by the process of FIG. 2.

FIG. 5 shows the guide 7 obtained with the process described with reference to FIG. 4, on which the rollers 8 driving the pallets 9 are supported.

Figure 6:
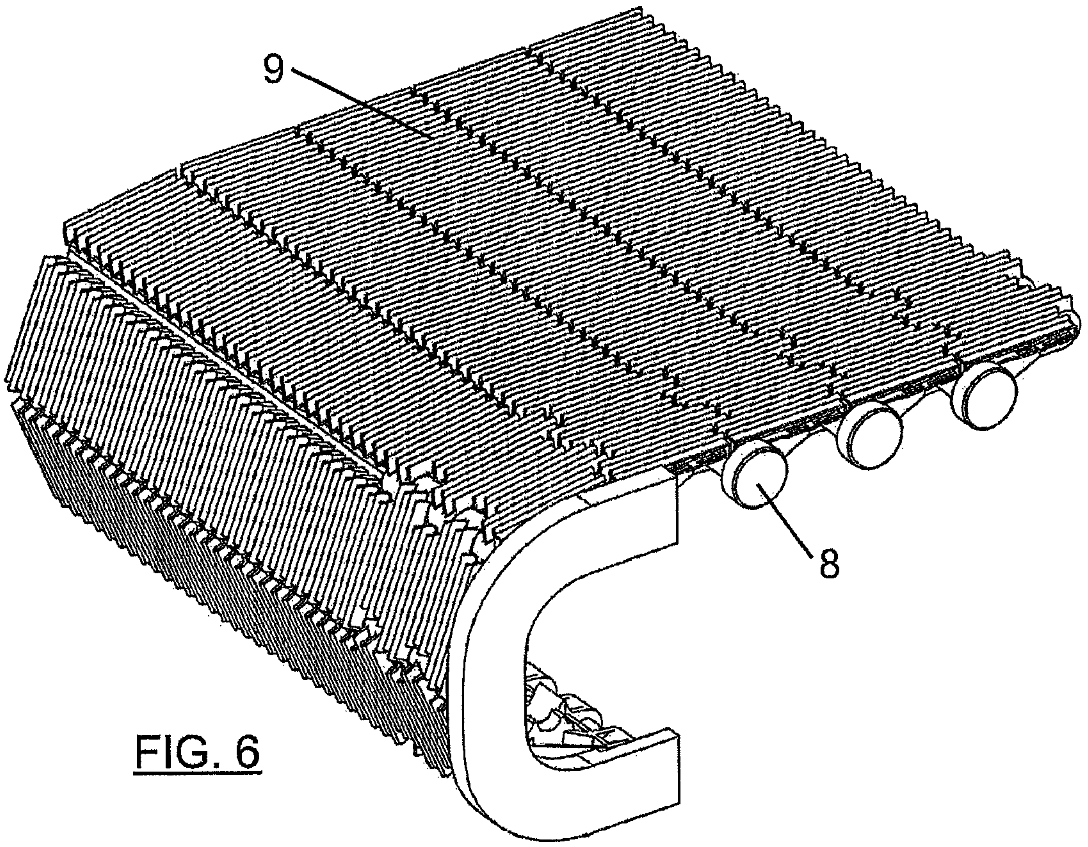
FIG. 6 shows the pallets turned around by means of the support rollers, with the turnaround guide obtained by the process of FIG. 2.

In a preferred construction, as shown in FIG. 6 the pallets 9 have a pitch equal to the chain pitch and the turnaround is carried out on the support wheels 8 of said pallets.

These pallets can be joined to one another to form part of the actual chains.

Figure 7:
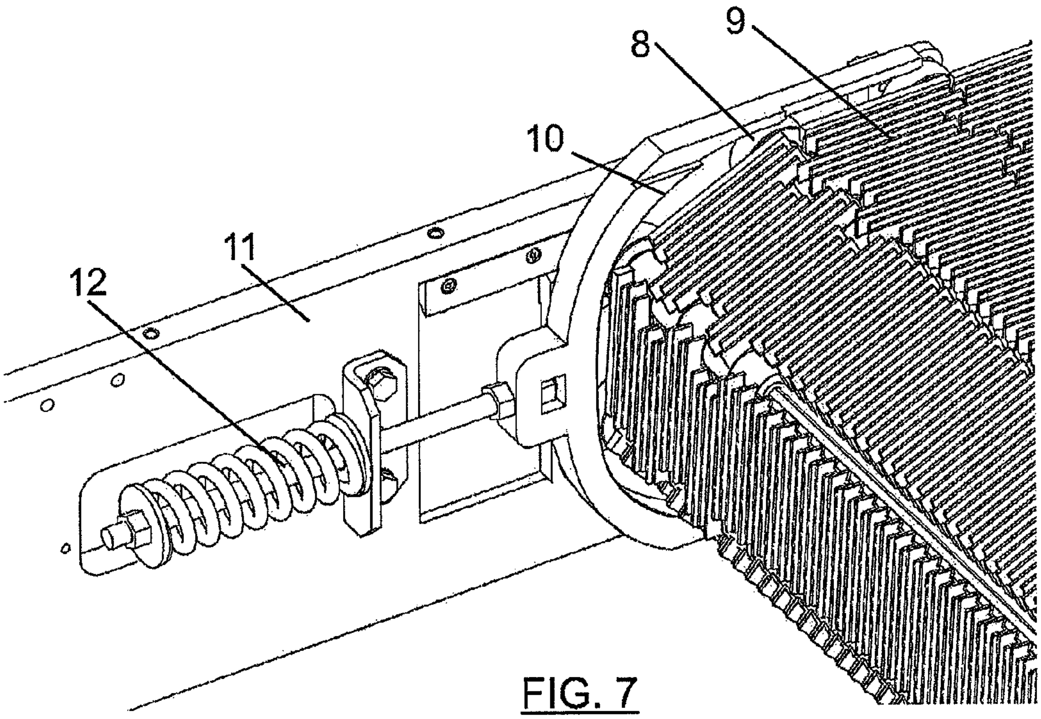
FIG. 7 shows the guide profile turning around the pallets with a system allowing the tensioning with respect to the frame.
Figure 8:
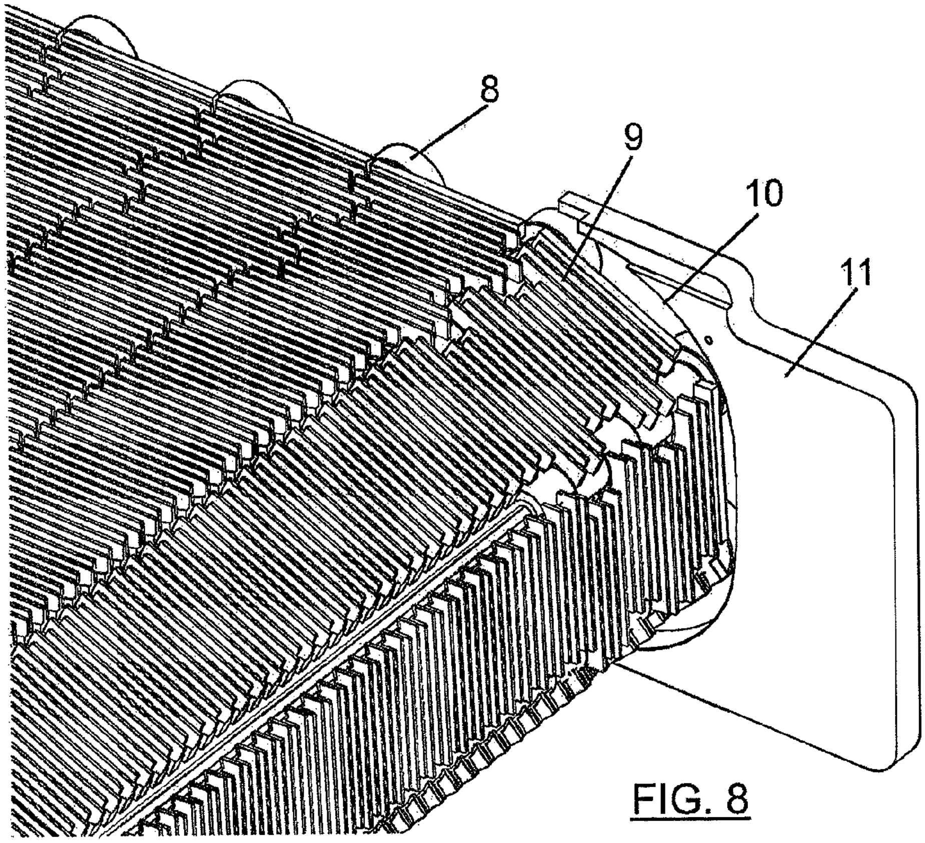
FIG. 8 shows the guide profile turning around the pallets with a system fixed to the frame.

The turnaround guides can be fixed (FIG. 8) or floating (FIG. 7) to allow tensioning the traction band if the drive system thereof requires it.

The invention claimed is:

1. A turnaround curve system for a compact chain conveyor system having minimal oscillation due to speed fluctuations, comprising a chain having linear traction which is driven through turnaround sections by means of passive turnaround guides, wherein the turnaround guides define a guide path obtained by appending a family of curves corresponding to paths defined by six points, said six points corresponding to six linkage positions of consecutive links of the chain in the turnaround sections, such that:

a first path between the first point and the second point and a fifth path between the fifth point and the sixth point define a constant linear speed parallel to a straight section of the chain between the turnaround sections;

a second path is between the second point and the third point and the fourth path is between the fourth point and the fifth point;

a third path is between the second and fourth path;

wherein each path is of substantially the same length wherein when each linkage passes to a position occupied by the previous linkage in a time interval "t", the paths are defined by six points determined by the following equations:

$$X1=-P;$$

$$Y1=H/2;$$

$$X2=0;$$

$$Y2=H/2;$$

$$X3=P*\cos(b);$$

$$Y3=P/2;$$

$$X4=P*\cos(b);$$

$Y4=-P/2;$ $X5=0;$ $Y5=-H/2;$ $X6=-P;$ $Y6=-H/2;$ where:

P: chain pitch value;

H: distance between a first branch and a second branch of the chain;

b=a sin((H/2−P/2)/P)

wherein the curves of the paths are further defined by the following equations:

$X1(t)=-P+P*t;$ $Y1(t)=H/2;$ 1-2:

$(X2-X1)\hat{}2+(Y2-Y1)\hat{}2=P\hat{}2;$ $X2/(Y2+D)=\tan(a)*t;$ where $a=a\tan(P*\cos(b)/(P/2+D));$ 2-3≡f1(D):

$(X3-X2)\hat{}2+(Y3-Y2)\hat{}2=P\hat{}2;$ $(X3-X4)\hat{}2+(Y3-Y4)\hat{}2=P\hat{}2;$ 3-4:

$t'=1-t$ $X4(t')=X2(t);$ $Y4(t')=-Y2(t);$ 4-5:

$X5(t)=-P*t;$ $Y5(t)=-H/2;$ 5-6:

assigning to "t" a value comprised between 0 and 1, selecting a set value for either P or H and iteratively varying D until the following condition is met:

$dX2/dY2(t=1)=dX3/dY3(t=0)$ $dX3/dY3(t=1)=dX4/dY4(t=0)$ the geometry of the guide is defined by the rolling path of the roller when the linkages follow the defined paths.

2. The turnaround curve system of claim 1, wherein the turnaround section further comprises a counterguide.

3. The turnaround curve system of claim 1, wherein the turnaround guide is manufactured by means of a process selected from press forming, machining, deep drawing and combinations thereof.

4. The turnaround curve system of claim 3, wherein the turnaround counterguide is manufactured by means of a process selected from press forming, machining, deep drawing and combinations thereof.

5. The turnaround curve system of claim 3, wherein the guide and counterguide are fixed to the frame.

6. The turnaround curve system of claim 3, wherein the guide and counterguide are installed by means of a device to allow tensioning a traction cable with respect to the frame.

7. The turnaround curve system of claim 1, wherein the turned around traction chain is connected to a conveyor element selected from mechanical stairs and a moving walkway.

8. The turnaround curve system of claim 1, wherein the turned around traction chain is connected to a moving walkway comprising a plurality of pallets having a pallet pitch equal to the traction chain pitch P.

9. The turnaround curve system of claim 8, wherein the pallets joined to one another form the traction chain.

10. The turnaround curve system of claim 1, wherein P is between 100 mm and 450 mm and H is about 268 mm.

11. The turnaround curve system of claim 1, wherein P is about 127 mm and H is between 200 mm to 1100 mm.

12. The turnaround curve system of claim 1, wherein P is about 127 mm and H is about 268 mm.

13. The turnaround curve system of claim 1, wherein a slope at an end of the second path is equal to a slope at a beginning of the third path.

* * * * *

UNITED STATES PATENT AND TRADEMARK OFFICE

CERTIFICATE OF CORRECTION

PATENT NO. : 8,123,025 B2
APPLICATION NO. : 12/205343
DATED : February 28, 2012
INVENTOR(S) : Gonzalez Alemany et al.

It is certified that error appears in the above-identified patent and that said Letters Patent is hereby corrected as shown below:

In the Specification

Col. 3, line 14: "*X3=P/2;*" should read --*Y3=P/2*;--

Col. 3, line 18: "*X4=-P/2;*" should read --*Y4=-P/2*;--

Col. 3, line 53: "with an optical value" should read --with an optimal value--

Signed and Sealed this
Fourth Day of March, 2014

Michelle K. Lee

*Deputy Director of the United States Patent and Trademark Office*